US008220786B2

(12) United States Patent
Armstrong et al.

(10) Patent No.: US 8,220,786 B2
(45) Date of Patent: Jul. 17, 2012

(54) TILE HOLDING FIXTURE ASSEMBLY

(75) Inventors: Sam Armstrong, Arlington Heights, IL (US); Peter Denley, Lake Zurich, IL (US); Timothy Baker, Aurora, IL (US); Jie Liu, Lisle, IL (US); Loren Doppelt, Palatine, IL (US); Dale S. Dilulio, Saukville, WI (US); Scott Micoley, Cedarburg, WI (US); Ronald Bradbery, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 632 days.

(21) Appl. No.: 12/433,269

(22) Filed: Apr. 30, 2009

(65) Prior Publication Data

US 2009/0273130 A1 Nov. 5, 2009

Related U.S. Application Data

(60) Provisional application No. 61/126,219, filed on May 2, 2008.

(51) Int. Cl.
*B23Q 3/00* (2006.01)
*B25B 1/00* (2006.01)

(52) U.S. Cl. ............. 269/16; 269/54.5; 269/56; 269/97; 269/53; 29/281.1; 125/35

(58) Field of Classification Search .................... 269/16, 269/289 R, 29.1, 75, 97, 53, 54.4, 54.5, 56, 269/329, 303; 29/281.1; 125/35
See application file for complete search history.

(56) References Cited

U.S. PATENT DOCUMENTS

| | | | | | |
|---|---|---|---|---|---|
| 1,915,340 | A * | 6/1933 | Van Berkel | ................... | 269/170 |
| 2,270,158 | A | 1/1942 | Baesgen et al. | | |
| 3,643,335 | A | 2/1972 | Smith | | |
| 4,396,217 | A * | 8/1983 | Hodgson et al. | .............. | 294/131 |
| 4,635,692 | A | 1/1987 | Hulse et al. | | |
| 5,351,730 | A | 10/1994 | Lewellen et al. | | |
| 5,740,732 | A * | 4/1998 | Karlyn et al. | .............. | 101/128.4 |
| 5,862,842 | A | 1/1999 | You | | |
| 6,202,530 | B1 | 3/2001 | Cawley | | |
| 6,834,438 | B1 | 12/2004 | Heister | | |
| 6,932,074 | B2 | 8/2005 | Cheng et al. | | |
| 6,948,892 | B2 * | 9/2005 | Hummel | ....................... | 409/182 |
| 7,617,578 | B2 * | 11/2009 | Collins | ......................... | 29/26 A |

FOREIGN PATENT DOCUMENTS

| | | |
|---|---|---|
| DE | 90 15 218.2 | 3/1991 |
| GB | 778865 | 7/1957 |

* cited by examiner

*Primary Examiner* — Monica Carter
*Assistant Examiner* — Melanie Alexander
(74) *Attorney, Agent, or Firm* — Greer, Burns & Crain, Ltd.

(57) ABSTRACT

Embodiments of the present invention are directed to a fixture assembly that is capable of holding work pieces such tiles of various sizes in various positions in a manner which enables freehand cutting. Various embodiments include a main fixture having a working top surface area that includes strategically placed cylindrical openings that are configured to receive easily manipulated tile holding clamps, various dogs that can be removably secured to the fixture in order to place tiles in a desirable position to be held during a cutting operations. The fixture is light weight and is easily transportable to a jobsite and has the capability of storing the clamps, dogs, marking instruments and the like.

22 Claims, 10 Drawing Sheets

TILE HOLDING FIXTURE ASSEMBLY

BACKGROUND OF THE INVENTION

In the building and construction industry, ceramic and other types of tile is often used in many areas of buildings on floors as well as walls in commercial buildings, industrial installations and residences. Ceramic tile is installed by artisans who must cut the tiles to accommodate fixtures, drains and other exigencies that are encountered during a construction or rehabilitation project. Building restrooms, residential bathrooms as well as countless other projects may have ceramic tile installed in them. Such tiles can be sized from very small sizes to nearly two feet in length or width but most tiles are in the range of about 4" to 18".

Nearly all installations require the tiles to be custom cut on the jobsite. If straight cuts are to be made, the artisan or contractor generally has a circular saw that can be used to make a straight cut through a tile as is necessary. However, when unusual cuts such as curved cuts, corner cuts, hole cuts and the like need to be made to a particular piece of tile, such saws are often incapable of making them, and artisans usually make such cuts freehand using a rotary tool with a cutting bit, such as with a side or spiral cutting bit that may be installed in a power cutting tool such as a Rotozip® or Dremel®power tool.

Because artisans typically do tile work by themselves, even though there may be many of them on a job, it is important that they have the ability to make freehand cuts such as a circular opening for a drain or a toilet fixture or a corner cut of a tile, for example. It is important that the tile be supported across much of the surface area of the tile so that it will not break when stress is applied during the cutting operation. It is necessary to not only support the tile, but to hold it firmly in place while a cutting operation is performed. A fixture that is convenient and effective to use is highly desirable.

SUMMARY OF THE INVENTION

Embodiments of the present invention are directed to a fixture assembly that is capable of holding work pieces such tiles of various sizes in various positions in a manner which enables freehand cutting. Various embodiments include a main fixture having a working top surface area that includes strategically placed cylindrical openings that are configured to receive easily manipulated tile holding clamps, various dogs that can be removably secured to the fixture in order to place tiles in a desirable position to be held during a cutting operations. The fixture is light weight and is easily transportable to a jobsite and has the capability of storing the clamps, dogs, marking instruments and the like.

DETAILED DESCRIPTION OF THE PREFERRED EMBODIMENTS

Figure 1:
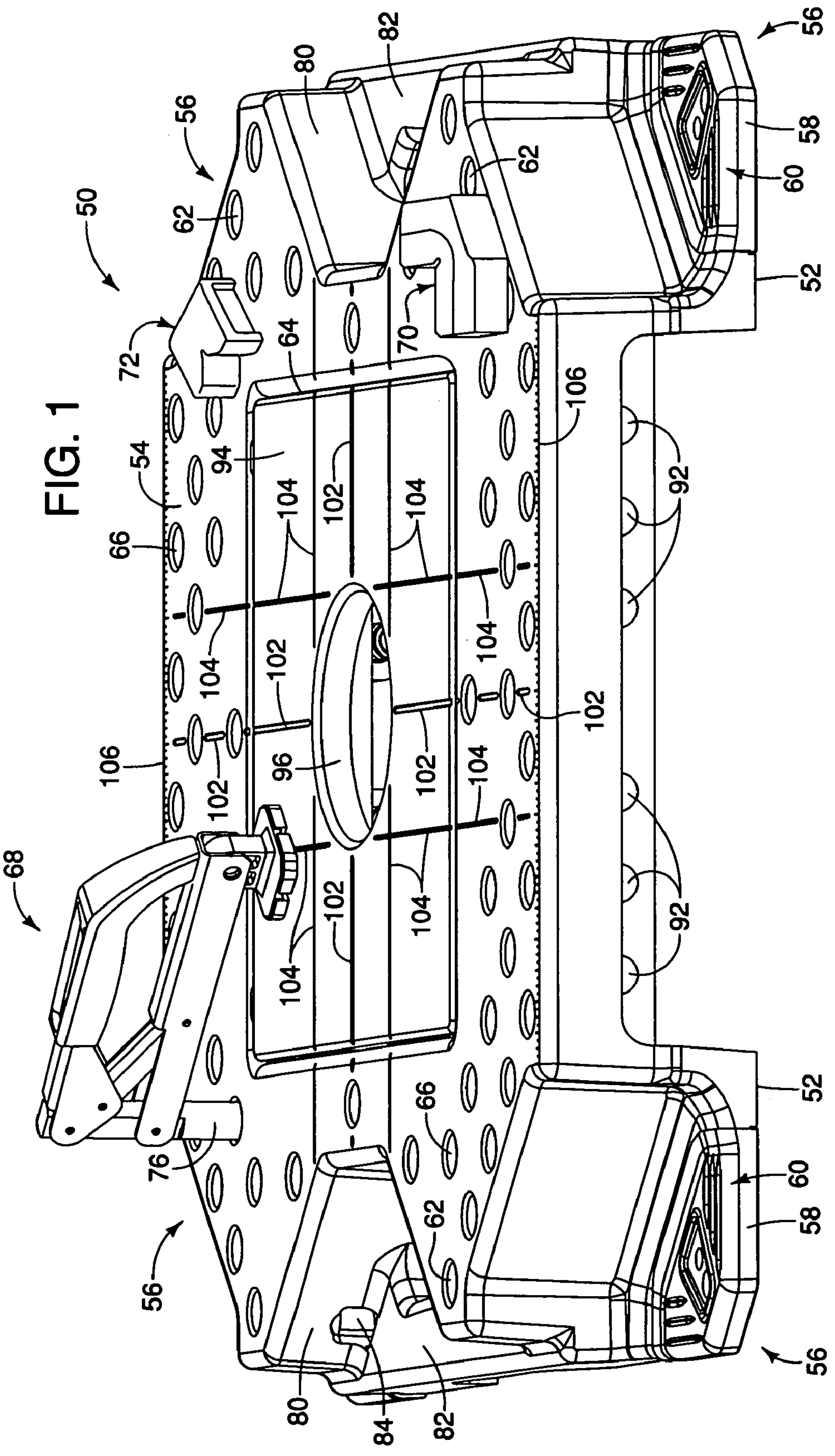
FIG. 1 is a perspective view of a preferred embodiment of the present invention and illustrates the fixture assembly shown together with a clamp as well as representative locking dogs that can be used to lock a tile in position to be cut.

Various embodiments of the tile fixture assembly of the present invention are shown in the drawings and include a main fixture, indicated generally at 50, which is shown in FIGS. 1-4. The assembly shown in the perspective view of FIG. 1 has assembly components attached and installed to the main fixture 50 that is shown separately in FIGS. 2-4. The main fixture 50 has a generally square overall configuration when viewed from above, although it should be understood that it could also be a rectangular configuration. It preferably has an approximate 24"×24" overall size although the overall size could be increased or decreased, if desire. The 24"×24"dimensions are preferred inasmuch as they permit an artisan to position and cut tiles within the range of approximately 4 inches to approximately 18 inches which is the size of most tiles that are presently being installed in commercial as well as residential installations. The height of the fixture 50 is approximately 4" from a bottom surface 52 to a top surface 54 although it also could be increased or decreased.

Each of the four corner portions, indicated generally at 56, are configured so that the top corner surface 54 and a substantial volume below it is removed to enable a tile that is positioned on the top surface 54 so that a portion of it overhangs the corner portion 56 to have its corner cut away. The corner portions 56 having a lower support surface 58 configured to define corner legs 58 that defines a base for the fixture 50 and is also configured to receive a knee pad component, indicated generally at 60, (see FIGS. 9-13) which an artisan can comfortably kneel down on to hold the fixture 50 while a cutting operation is performed. The lower support surfaces 56 also have openings to receive screws, bolts or the like for mounting the fixture 50 to a surface for stability, if desired.

The fixture 50 has a plurality of preferably circular openings 62 which are strategically located throughout the top surface 54 of the fixture and which are configured to receive various components that can be used to hold and clamp the tiles that are to be cut by an artisan. These holes 62 are preferably of a standard diameter which may be on the order of ½ to ¾ of an inch in diameter, but which can be larger or smaller than those of this preferred range. While they can be of different sizes, it is preferred that they be of a single size so that the components that are insertable in them can be interchangeably located in many different positions. As is evident, there are a relatively large number of openings 62 in the top surface 54 and are distributed around the outer periphery as well as near a generally quadrilateral opening 64, which in the embodiment shown in FIGS. 1-4. is a square opening that is centrally located in the fixture 50.

The openings 62 are formed so that they have a generally cylindrical inside wall 66 that extends downwardly approximately an inch although a slightly longer wall may be provided. The cylindrical wall 66 provides support for a holding clamp, indicated generally at 68, to be inserted as well as stationary corner dogs 70 (see FIGS. 14-18), rotatable corner dogs 72 (see FIGS. 19-23) as well as a vacuum hose mount dog 74 (see FIGS. 24-28).

The holding clamp 68 has a cylindrical extension 76 that has a diameter only slightly smaller than the inside diameter of the opening wall 66 so that it snugly fits in the openings 62 and can be easily removed. The clamp 68 can be installed in any of the openings 62 and is thereby capable of holding down a tile virtually anywhere on the top surface 54.

Figure 4A:
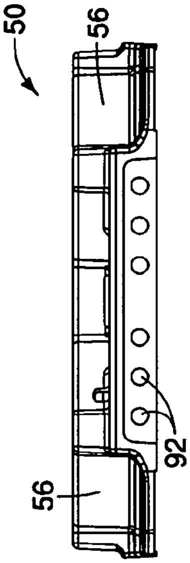
FIG. 4A is a front elevation of the fixture shown in FIG. 1.
Figure 4B:
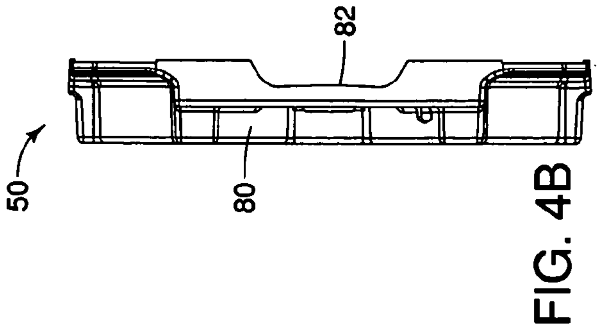
FIG. 4B is a right side view of the fixture shown in FIG. 3.

The left and right sides of the fixture 50 have a recess 80 with a bridging portion near the bottom surface that defines a pair of handles 82 that enable the artisan to carry the fixture assembly. It is noted that the handles 82 are designed to not extend beyond the general periphery of the fixture 50 and are vertically spaced upwardly from the bottom surface 52 of the legs 58 so that an artisan can easily pick up the fixture 50 as is evident from FIG. 4B. The handles 82 are designed with sufficient structural integrity to enable an artisan to stand or kneel on them without damaging them. As best shown in FIGS. 1 and 4B, the left side recess 80 also has a relatively small opening 84 which extends inwardly toward the square opening 64 and is configured to receive one or more of marking or writing utensils, such as a regular hexagonal cross-sectional pencil, a round pencil, a flat carpenter's pencil, or felt tipped pens or the like that can be stored in the fixture assembly. An internal spring clip (not shown) may be provided to provide a holding force on the writing instruments.

Figure 3:
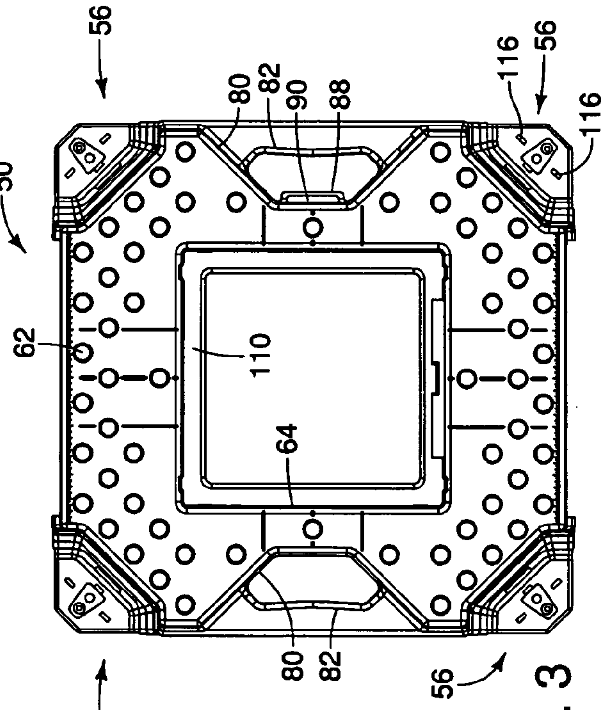
FIG. 3 is a top plan view of the fixture shown in FIG. 2.
Figure 2:
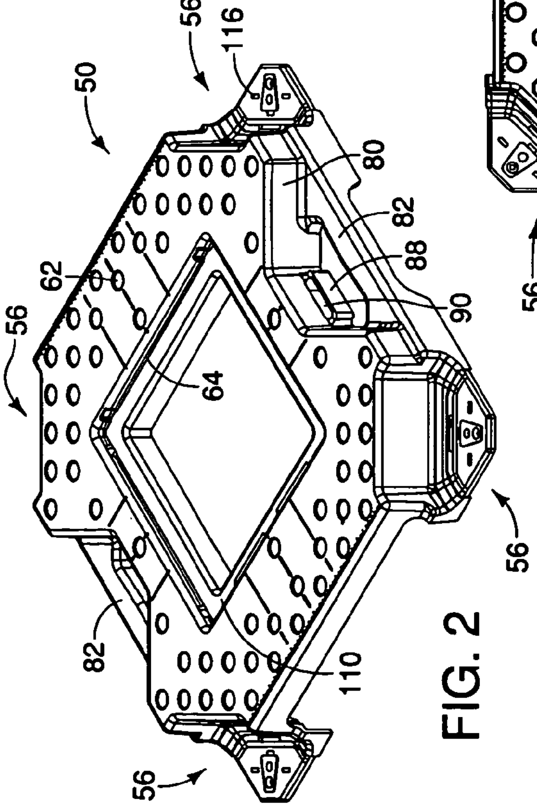
FIG. 2 is another perspective view of the main fixture shown without any of the additional components.
Figure 5:
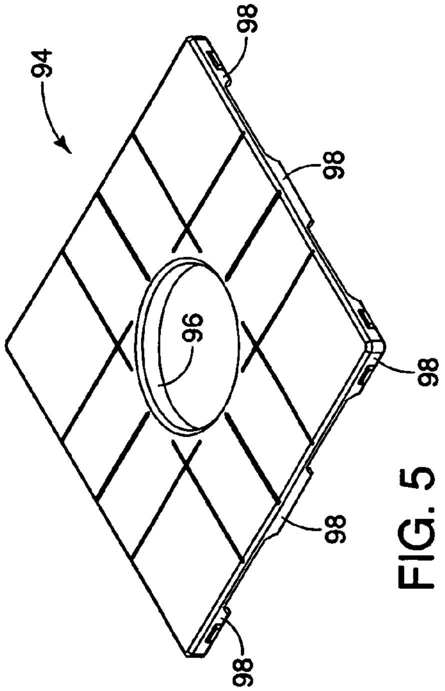
FIG. 5 is a perspective view of a support insert that can be installed in the center portion of the fixture shown in FIGS. 2-4.
Figure 6:
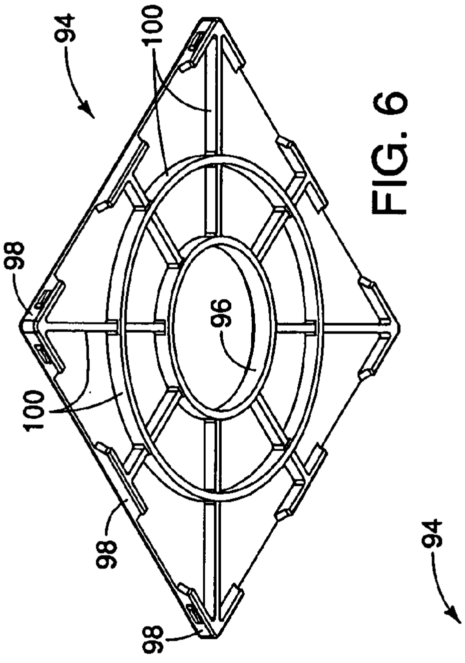
FIG. 6 is a perspective view of the bottom of the support insert shown in FIG. 5.
Figure 7:
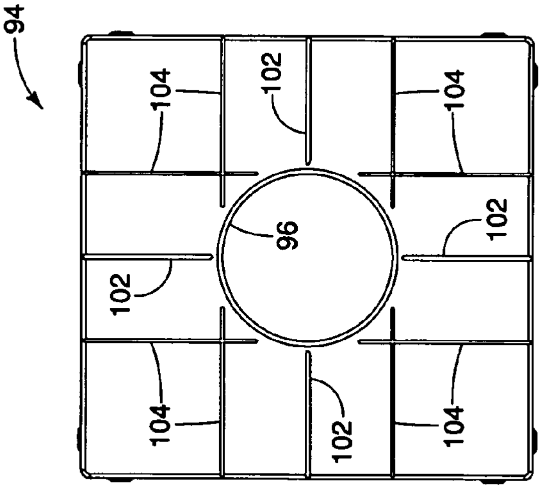
FIG. 7 is a top plan view of the insert shown in FIGS. 5 and 6.
Figure 8:
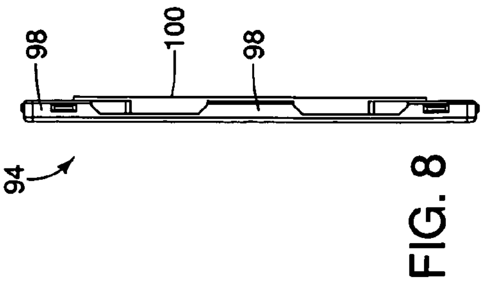
FIG. 8 is a side view of the insert shown in FIGS. 5-7.
Figure 9:
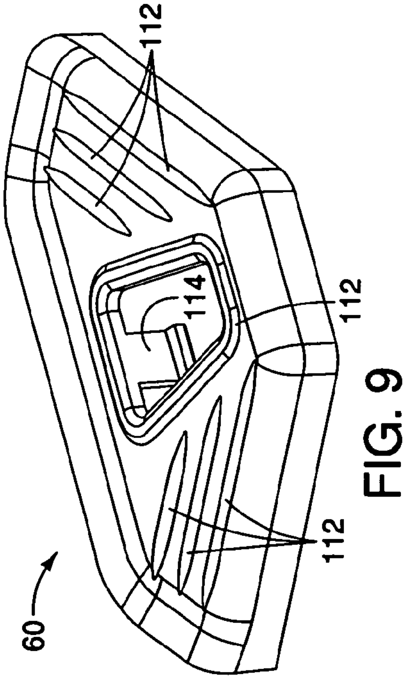
FIG. 9 is a perspective view of a knee pad component that is installed at the four corners of the fixture shown in FIGS. 2-4.
Figure 10:
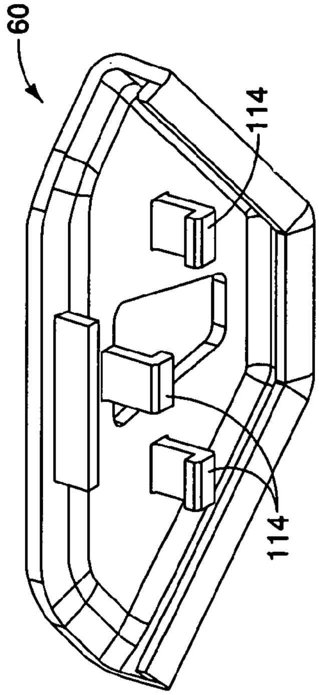
FIG. 10 is a perspective view of the underside of the knee pad component shown in FIG. 9.
Figure 11:
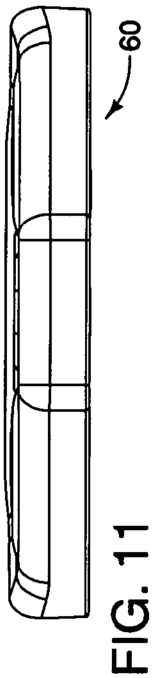
FIG. 11 is a front view of the knee pad component shown in FIG. 9.
Figure 12:
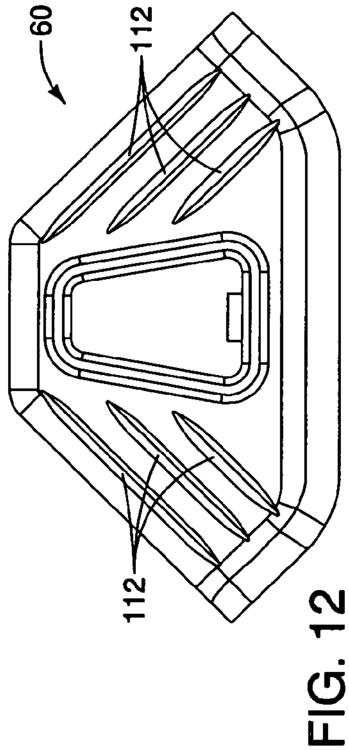
FIG. 12 is a top plan view of the knee pad component shown in FIG. 9.
Figure 13:
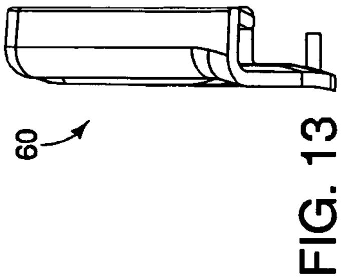
FIG. 13 is a side view of the knee pad component shown in FIG. 12.
Figure 16:
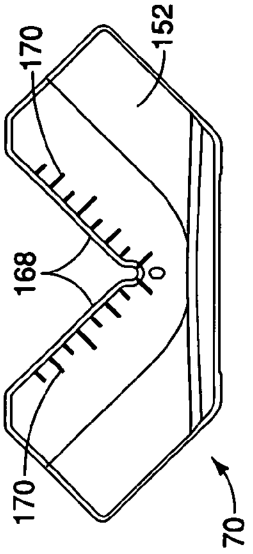
FIG. 16 is a top plan view of the stationary corner dog shown in FIGS. 14 and 15.
Figure 18:
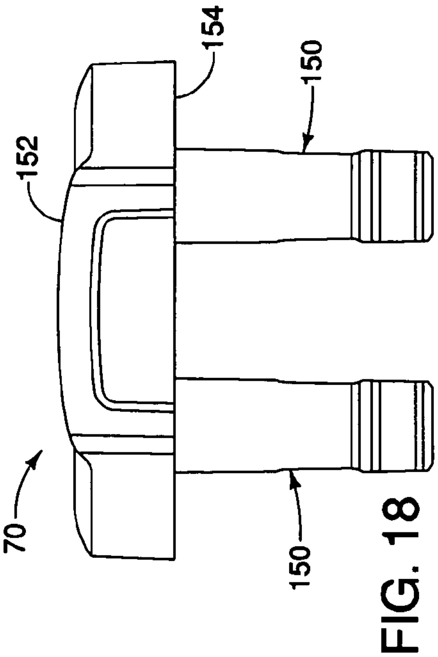
FIG. 18 is a front view of the stationary corner dog shown in FIGS. 14-17.
Figure 15:
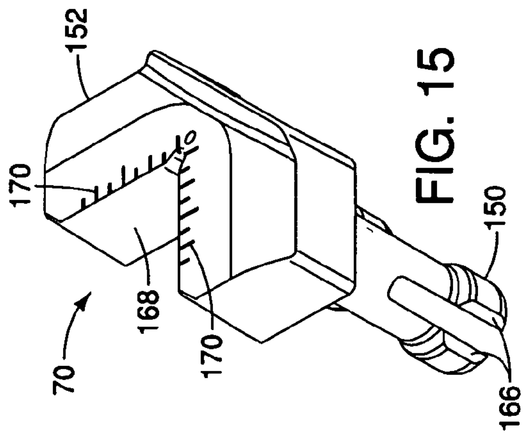
FIG. 15 is a perspective view of the top of the stationary corner dog shown in FIG. 14.
Figure 17:
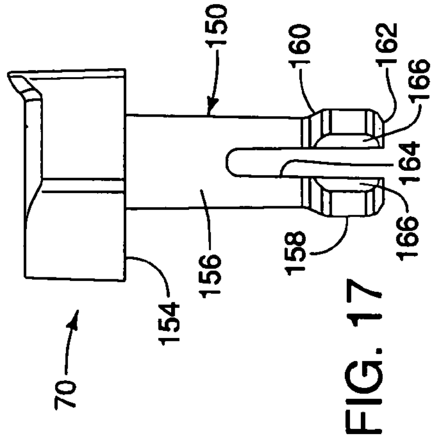
FIG. 17 is a side view of the stationary corner dog shown in FIGS. 14-16.
Figure 14:
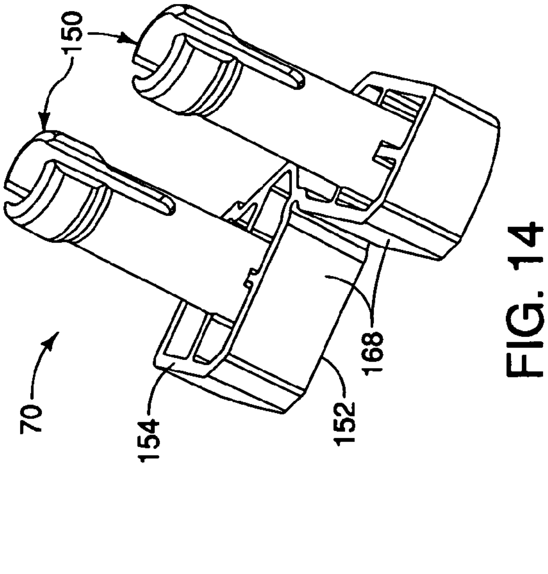
FIG. 14 is a perspective view of the bottom of a stationary corner dog.
Figure 19:
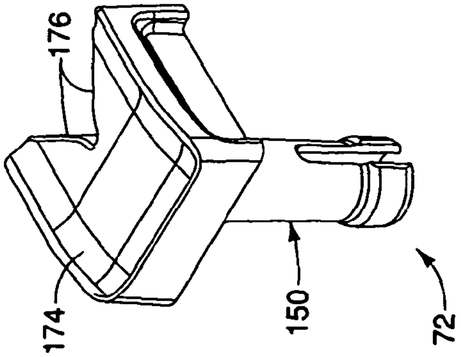
FIG. 19 is a perspective view of the top of a rotatable corner dog.
Figure 20:
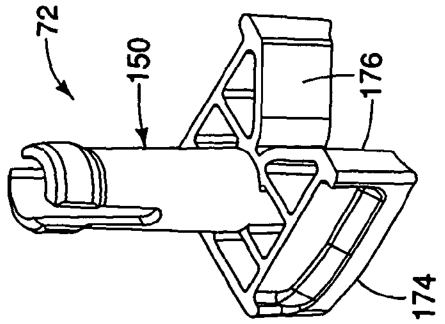
FIG. 20 is a perspective view of the bottom of the rotatable corner dog shown in FIG. 19.
Figure 21:
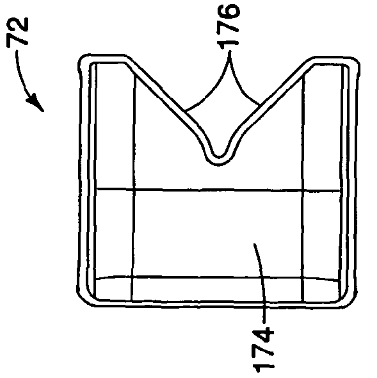
FIG. 21 is a top plan view of the rotatable corner dog shown in FIGS. 19 and 20.
Figure 22:
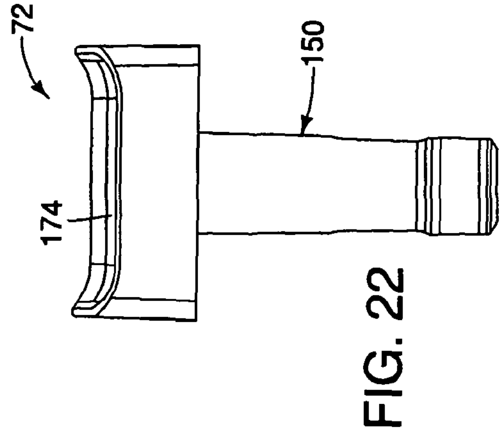
FIG. 22 is a rear plan view of the rotatable corner dog shown in FIGS. 19-21.
Figure 23:
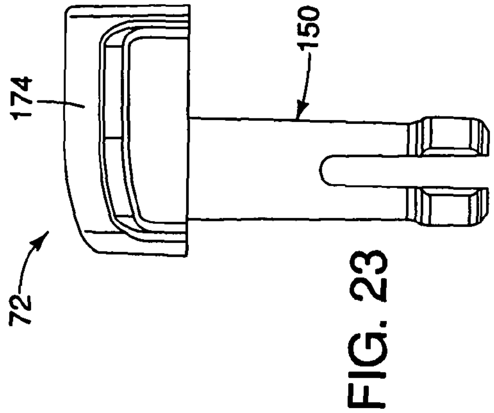
FIG. 23 is a side plan view of the rotatable corner dog shown in FIGS. 19-22.
Figure 26:
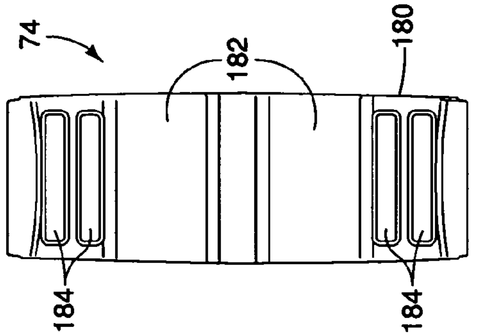
FIG. 26 is a top plan view of the vacuum hose dog mount shown in FIGS. 24 and 25.
Figure 28:
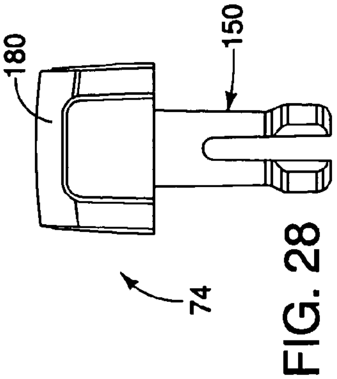
FIG. 28 is an end view of the vacuum hose mount dog shown in FIGS. 24-27.
Figure 25:
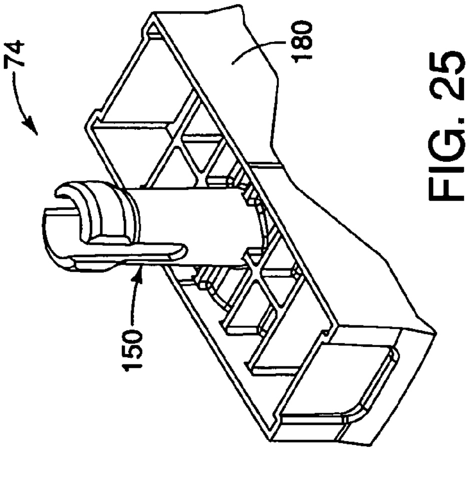
FIG. 25 is a perspective view of the bottom of the vacuum hose mount dog shown in FIG. 24.

Also, as is best shown in FIG. 3, the rightward recess 80 is provided with an extension 88 with an opening 90 therein which is configured to receive a clip of a tape measure that may be stored on the fixture 50. As shown in FIGS. 1 and 4A, the fixture 50 also has a number of storage openings 92 beneath the surface 54 thereof that are aligned horizontally rather than vertically. The storage openings 92 are preferably the same size as the openings 62 on the top surface of the fixture and are available for storing the dogs 70, 72 and 74 as well as the holding clamp 68. It is preferred that similar configured openings 92 also be provided at the rear of the fixture 50.

A removable support insert 94 is shown in FIGS. 1, 5-8 is also provided and it fits within the opening 64. The support insert 94 has a relatively small circular opening 96 which is preferably sized to be the same as a shower drain which is a opening that is often cut in tile. The opening 96 is of such smaller size so that it will provide support for smaller tiles that may be cut, such as square 4" tiles. The insert has downward extensions 98 around its perimeter and also has interior strengthening ribs 100. The insert preferably has indicia 102 that extends through the center of the opening 96 as well as indicia 104 that are coextensive with the outer edges of the opening 96 in orthogonal directions. These indicia may be slightly raised or lowered lines formed in the top surface or may be printed in some permanent manner.

When the support insert 94 is placed in the opening 64, the indicia 102 and 104 are aligned with similar indicia on the top surface 54 of the fixture 50, which is provided with the same reference numbers for clarity. The top surface also has indicia 106 located at the front and back edges of the top surface that define a ruler that can be used by an artisan to measure certain types of cuts. The opening 64 in the fixture 50 has an internal shoulder 110 that preferably extends completely around the periphery of the opening 64 as shown and is lower than the surface 62 by an amount corresponding to the thickness of the support insert 94 so that the upper surface of the insert 94 is coextensive with the surface 62 of the fixture 50. This enables the tile to be supported across the entire fixture when cutting is to be accomplished. The insert thickness is also preferably ½" although it may be thicker if desired.

Many artisans may prefer to cut and insert pieces of material that provide a sacrificial surface or cutting board into the opening 64 rather than use the support insert 94. The ½" thickness of the support insert 94 is equivalent to the thickness of standard drywall, ½" plywood, insulation board, sheetrock or the like. This usage enables the entire insert to be span wood material whereas the insert 94 has the circular opening 96 in it. The use of such disposable stock material enables the artisan to make routine cuts without worrying about damaging the support insert. It should also be understood that the internal shoulder 110 may be deeper than ½", in which case the thickness of the support insert 94 may be correspondingly increased. In this regard, multiple layers of drywall may then be used, as well as lumber of various thicknesses. For example, if the thickness of the support insert 94 and depth of the internal should 110 were 1-½", then three layers of drywall or standard 2×4 stock lumber could be placed in the opening 64.

The fixture 50 is preferably made of polypropylene foam that is glass filled, although other material may be used. Such glass filled polypropylene foam is desirable because it has the necessary strength and is lightweight. Moreover, it will not damage the relatively expensive cutting tools if the artisan inadvertently cuts into the fixture itself.

Because the fixture is relatively hard, the corner portions 56 are provided with the kneepad component 60 which is preferably made of a softer material such as rubber, or at least has raised surfaces 112 that are made of resilient material. The kneepad component enables an artisan to kneel down onto the corner portion while working and hold the fixture firmly in place so that it will not slide during a cutting operation. The kneepad component has a number of tangs 114 which fit into corresponding openings 116 in the fixture 50. The kneepad component 60 is thereby designed and configured to be snap fit in place. Portions of it may extend and contact the surface on which the fixture is placed, and may provide additional friction to keep the fixture from slipping.

Figure 31:
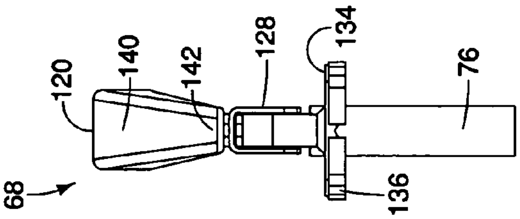
FIG. 31 is a front view of the holding clamp shown in FIGS. 29 and 30.
Figure 30:
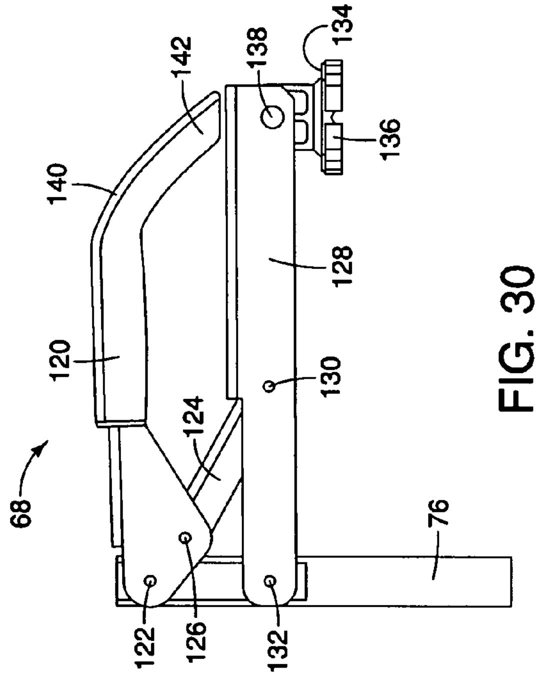
FIG. 30 is a side view of the holding clamp shown in FIG. 29.
Figure 29:
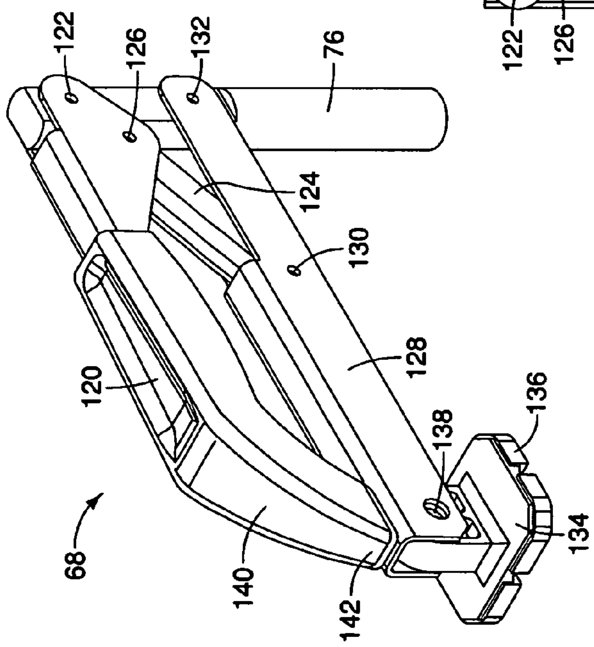
FIG. 29 is a perspective view of holding clamp.
Figure 32:
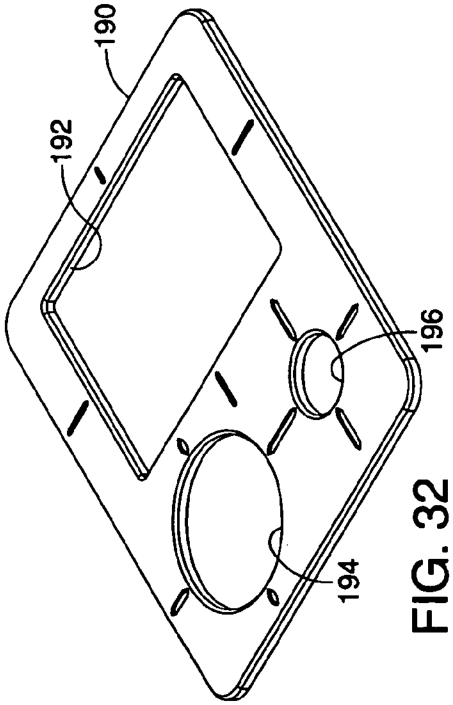
FIG. 32 is a perspective view of a template for marking representative openings that may be cut in a tile.
Figure 33:
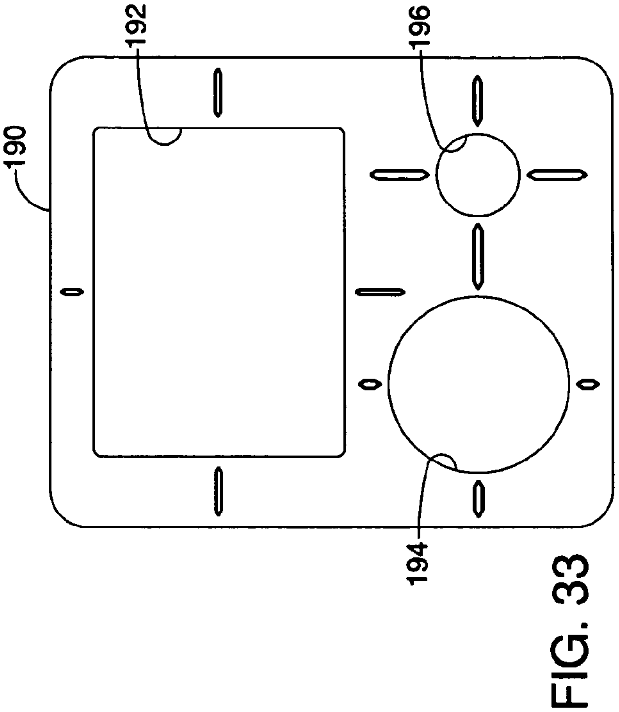
FIG. 33 is a top view of the template shown in FIG. 32.
Figure 34:
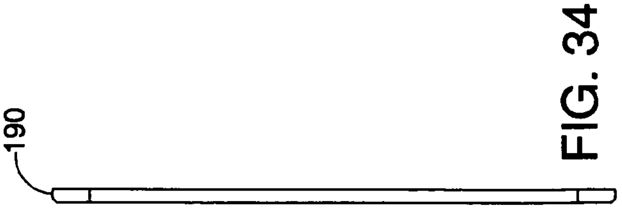
FIG. 34 is a side view of the template shown in FIGS. 32 and 33.
Figure 37:
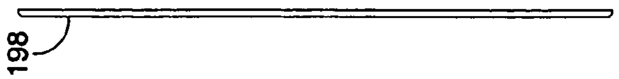
FIG. 37 is a side view of the template shown in FIGS. 35 and 36.
Figure 36:
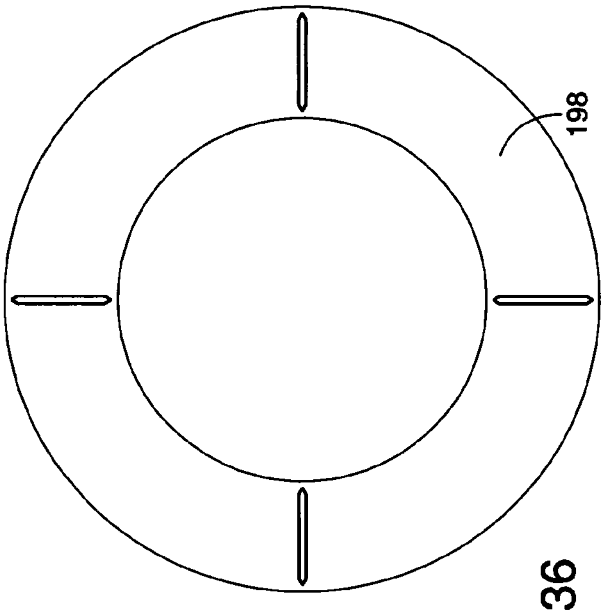
FIG. 36 is a top plan view of the template shown in FIG. 35.
Figure 35:
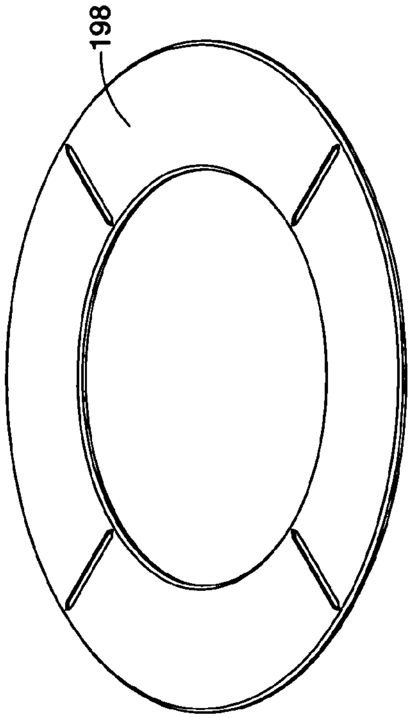
FIG. 35 is another template for marking two sizes of circular openings in a tile.

Turning now to the holding clamp 68 shown in detail in FIGS. 29-31, it has the cylindrical extension 76 that fits within an opening 62 and a handle 120 that is pivotable around a pin 122. The handle also is interconnected with a link 124 by pin 126 and the opposite end of the link 124 is pivotally connected to a lever arm 128 by pin 130. The lever arm is pivotally attached to the cylindrical extension 76 by pin 132 and it has a clamping pad 134 at its outer end which is provided with a preferably resilient pad material 136 that equalizes the forces being applied and prevents possible scratching of the tile that is being held down. The pad 134 is enlarged and is shown to be pivotally connected around pin 138 to accommodate tiles of different thicknesses.

The handle 120 has a downwardly inclined outer end portion 140 and also preferably has a tip 142 that extends downwardly to a position very close to the top surface of the lever arm 128. This effectively prevents the cord of a cutting tool from being caught between the handle and the lever arm 128 which can be aggravating to an artisan. The tip 142 may be made of a flexible material, if desired, to minimize the possibility that an artisan would be pinched when the handle is placed in a holding position.

The clamp is easily operated by placing the extension 76 into a convenient opening depending on where the tile is to be placed for cutting, pulling the handle up while placing the tile in the desired location and single handedly moving the handle downwardly to lock the clamp in place. The depth of penetration of the cylindrical extension 76 may vary depending upon the thickness of the tile, but the manipulation of the clamp can be made to provide the desired holding force by moving the handle toward the locking position. If the holding force is too great, the cylindrical extension 76 can be incrementally backed out so that the holding clamp can be locked.

Turning now to the dogs 70, 72 and 74, all of them have at least one mounting post, indicated generally at 150. The mounting posts 150 are used with each of the dogs 70, 72 and 74 and preferably have the same design and construction. The dogs are preferably fabricated from plastic or plastic-like material that has some flexibility. The configuration of the mounting post 150 will be described in detail with regard to FIGS. 14 and 17 and the reference numbers relating to the detailed configuration have been omitted from FIGS. 19-28.

The stationary corner dog 70 shown in FIGS. 14-18 has a head portion 152 and a bottom head portion surface 154, and two mounting posts 150 which are spaced apart from one another by the same dimension as many of the openings 62 in the fixture top surface 54 are spaced apart. Thus, when the stationary corner dog 70 is installed in the top surface openings 62, the bottom surface 154 will come in contact with the surface 54 of the fixture 50. The mounting post 150 has a cylindrical portion 156 that extends from the bottom surface 154 to an enlarged end portion 158. The cylindrical portion 156 is hollow in the sense that it has a finite wall thickness that provides the necessary strength, but which is somewhat flexible enabling the dog to be inserted into the opening 62. In this regard, the outer diameter of the cylindrical portion 156 is approximately the same size and is only slightly smaller than the inside diameter of the openings 62. The enlarged end portion 58 is slightly larger than the inside diameter of the opening 62 and there are ramp portions 160 and 162 that transition between the diameters of the cylindrical portion 156 and 158. The ramp portion 162 facilitates insertion of the enlarged end portion 158 into the opening 62 whereas the ramp portion 160 enables the dog 70 to be removed. The length of the cylindrical portion 156 is approximately the same as the length of the cylindrical wall 66 of the openings 62. Therefore the ramp portion 160 as well as the enlarged end 158 will extend beyond the cylindrical wall 66 and the ramp portion 160 will tend to hold the dog in place.

To facilitate insertion and removal of the dog, the mounting post 150 has an axial slot 164 which extends approximately half way up the length of the post and separates the end portion 150 into two halves that can be flexed toward one another during insertion and removal of the dog. There are bevels 166 cut off of the edges of each half to eliminate sharp corners which could cut an artisan.

The stationary corner dog 70 has faces 168 positioned at right angles to one another and the top surface of the head 152 also has ruler indicia 170 above each face. The indicia 170 on the dog 70 can provide a zero datum for the indicia 106 on the fixture 50. The stationary corner dog 70 can be installed in adjacent holes at the proper angle to one another and one corner of a tile can be placed in the dog. The artisan can then set a holding clamp 68 which will hold the tile in place for a cutting operation.

With regard to the rotatable corner dog 72, it has only one mounting post 150 and is therefore loosely rotatable in an opening 62. The rotatable corner dog 72 has a head portion 174 with orthogonal faces 176.

Figure 27:
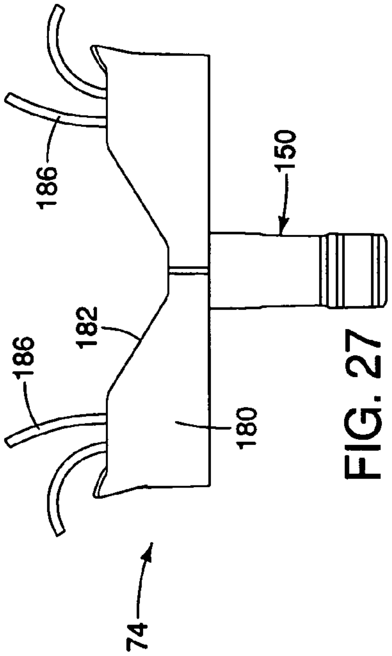
FIG. 27 is a plan view of the front of the vacuum hose dog mount shown in FIGS. 24-26, showing portions of a holding strap.
Figure 24:
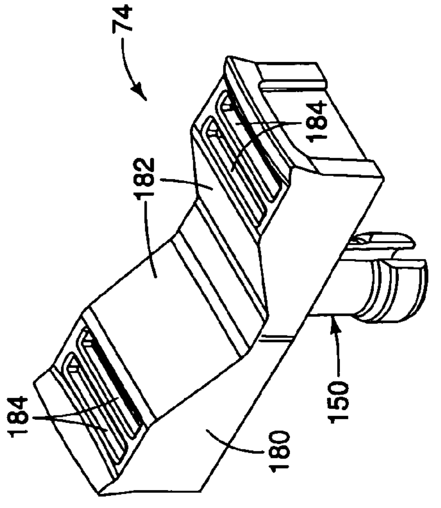
FIG. 24 is a perspective view of top of a vacuum hose mount dog without a holding strap.

The vacuum hose mount dog 74 has an elongated head portion 180 that has a generally V-shaped recess 182 in the top thereof as well as a pair of slots 184 located on opposite end portions. The slots are configured to receive a strap 186 that will be secured at the opposite end portions as shown in FIG. 27 and extend over a vacuum hose in the event that an artisan is using a vacuum system to remove dust during cutting. The strap 186 can accommodate vacuum hoses of various diameters, such as those having diameters from 1-½" to 2-¼", for example. It is apparent that the dog 74 can be positioned nearly anywhere on the surface 54 of the fixture 50.

Embodiments of the tile fixture assembly may include a template such as template 190 that includes a square opening 192, a large circular opening 194 and a smaller opening 196. Another template 198 has inside and outside diameters that are sized to fit toilet and shower cut outs. It is preferred that such templates will have standard sized openings that will enable marking of most plumbing fixture and other openings.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A portable fixture assembly configured to enable a user to hold at least one work piece that can be variously sized for the purpose of performing a work operation on the work piece, said fixture assembly comprising:

a main fixture having a generally quadrilateral cuboid configuration with side walls, a bottom surface and a working top surface area that includes a plurality of spaced openings positioned therein along at least the outer peripheral portion of said top surface, said openings having cylindrical walls extending downwardly therefrom a first predetermined distance to an end surface;

at least one removable holding clamp having a cylindrical extension sized to fit within one of said spaced openings, said clamp having a pivotable clamping portion and a pivotable handle portion which is operable to pivot said clamping portion into a clamping relation with a work piece placed on said top surface area.

2. A portable fixture assembly as defined in claim 1 wherein said main fixture has corner portions located at corners of said top surface generally oriented at 45° relative to said side walls, each of said corner portions extending to a lower support portion adjacent said bottom surface and configured to receive a knee pad component.

3. A portable fixture assembly as defined in claim 2 wherein said main fixture has a recess located between adjacent corner portions on at least one side thereof, said recess extending from said top to said bottom surface, and having a handle portion extending between opposite sides of said recess near said bottom surface, said handle portion not extending appreciably beyond a plane of said side wall in which said recess is located.

4. A portable fixture assembly as defined in claim 3 wherein said recess includes an extension of a side wall of the recess that is spaced from the side wall and is configured to retain a clip of a tape measure placed in said spaced extension.

5. A portable fixture assembly as defined in claim 3 wherein said main fixture has horizontal openings located below said top surface between adjacent corner portions which do not have a recess, said horizontal openings being configured to store holding clamps and dog structures that are not placed in openings in said top surface.

6. A portable fixture assembly as defined in claim 1 wherein said main fixture has a generally quadrilateral opening formed in a center portion of said top surface, with an internal shoulder extending generally around an entire periphery of said opening at a third predetermined depth, said third predetermined depth corresponding to a thickness of pieces of one of a group consisting of standard plywood, sheetrock, and insulation board.

7. A portable fixture assembly as defined in claim 6 wherein said assembly further comprises one or more inserts having a thickness corresponding to said third predetermined depth, said inserts openings sized and shaped to conform to standard electrical construction boxes or plumbing fixtures.

8. A portable fixture assembly as defined in claim 2 further comprising resilient knee pad components that are removably attached to said lower support portion to provide comfort for a user.

9. A portable fixture assembly as defined in claim 2 wherein said openings are strategically arranged in said top surface so that one of said holding clamps can be positioned to clamp a work piece at any position on said top surface.

10. A portable fixture assembly as defined in claim 1 wherein said openings are strategically arranged so that at least 80% of the openings have at least one adjacent opening spaced a second predetermined distance therefrom.

11. A portable fixture assembly as defined in claim 1 wherein the main fixture is formed of glass filled polypropylene foam material with wall thicknesses within the range of approximately ⅛ inch to 3/16 inch, said openings being within the range of approximately ½ to ¾ inch in diameter, and said general cuboid configuration is approximately 24 inches by 24 inches by 4 inches.

12. A portable fixture assembly as defined in claim 10 further comprising at least one dog structure having a head portion and at least one mounting post that can be removably secured in one of said openings, said mounting post having a cylindrical intermediate portion having a length at least generally equal to said first predetermined distance and an enlarged end portion that extends beyond said end surface of said cylindrical wall and expands beyond the inside diameter of said cylindrical wall to hold said post within said opening.

13. A portable fixture assembly as defined in claim 12 wherein said first predetermined distance is at least approximately 1 inch.

14. A portable fixture assembly as defined in claim 12 wherein said mounting post is generally hollow and has at least one axial slot extending from said enlarged end portion at least partially into said intermediate portion, said mounting post being made of a plastic or plastic-like material.

15. A portable fixture assembly as defined in claim 14 wherein said enlarged end portion has annular ramp portions on its outer end surface and on an inner portion transitioning between said enlarged end portion and said intermediate portion, said ramp portions facilitating insertion and removal of said dog structure relative to said openings.

16. A portable fixture assembly as defined in claim 12 wherein selective ones said dog structures have two mounting posts adjacent one another, the centerlines of said adjacent posts being separated by said second predetermined distance so that said dog structure can be inserted into adjacent openings in a non-rotational relation.

17. A portable fixture assembly as defined in claim 12 wherein selective ones of said dog structures have a first head portion with a corner reception area defined by vertical faces that are at right angles to one another configured to receive a corner of a work piece in a holding relationship.

18. A portable fixture assembly as defined in claim 17 wherein selective ones of said dog structures have said first head portion and a single cylindrical post to thereby define a rotatable dog structure configured to receive a corner of a work piece in a holding relationship.

19. A portable fixture assembly as defined in claim 12 wherein said top surface of said main fixture has measurement indicia located along at least opposite sides that do not have intermediate recesses and said first head portion has measurement indicia located above said vertical faces for providing zero datum information to a user.

20. A portable fixture assembly as defined in claim 12 wherein selective ones of said dog structures have a second head portion having a generally V-shaped upper surface and a flexible adjustable length strap configured to respectively receive and strap down one of various diameter vacuum hoses.

21. A portable fixture assembly as defined in claim 1 wherein said holding clamp clamping portion comprises a lever arm having one end pivotably connected to said cylindrical extension and an opposite end with a clamping pad for engaging a work piece, said handle being pivotably connected to said cylindrical extension and to a over-center link for pivoting said lever arm into and out of locking engagement, said handle being generally parallel to said lever arm when said holding clamp is in locking engagement, said handle having an outer end portion extending downwardly to a position in close proximity to said lever arm when in locking engagement to prevent a tool cord from being caught between said lever arm and said handle.

22. A portable fixture assembly as defined in claim 21 wherein a tip of said outer end portion is flexible to prevent a user from being pinched when placing said holding clamp in locking engagement.

* * * * *